(12) United States Patent
Belenger et al.

(10) Patent No.: US 7,280,954 B2
(45) Date of Patent: Oct. 9, 2007

(54) SYSTEM OPERATION TEST FACILITATING PROGRAM AND METHOD

(75) Inventors: Kim E. Belenger, North Dighton, MA (US); James R. Gannon, Coventry, RI (US); Maryellen Doherty, Middletown, RI (US); Dennis K. Bruce, Berkley, MA (US); Thomas Filiberto, Wakefield, RI (US); John L. Lehet, Waterford, CT (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 1098 days.

(21) Appl. No.: 10/137,737

(22) Filed: Apr. 30, 2002

(65) Prior Publication Data

US 2003/0204779 A1 Oct. 30, 2003

(51) Int. Cl.
*G06F 9/45* (2006.01)

(52) U.S. Cl. ...................................................... 703/22

(58) Field of Classification Search .................. 703/22
See application file for complete search history.

(56) References Cited

U.S. PATENT DOCUMENTS 6,523,137 B1 * 2/2003 Stone ........................ 714/38

* cited by examiner

*Primary Examiner*—Hugh Jones
(74) *Attorney, Agent, or Firm*—James M. Kasischke; Jean-Paul A. Nasser; Michael P. Stanley

(57) ABSTRACT

A method and system are provided by the present invention for developing functional software element that operates in an environment comprising a plurality of computer programs that are being simultaneously developed. A test facilitating computer program product is utilized to simulate the plurality of computer programs as seen by the functional software element. The functional software element has one or more internal software interfaces that interact with one or more simulated external software interfaces to provide an environment in which the operation of the functional element and the internal software interfaces thereof can be monitored. The test facilitating tool permits creation of files that may be utilized to create an operational scenario during which messages that are received by and sent from said functional software element can be monitored.

9 Claims, 2 Drawing Sheets

SYSTEM OPERATION TEST FACILITATING PROGRAM AND METHOD

STATEMENT OF THE GOVERNMENT INTEREST

The invention described herein may be manufactured and used by or for the Government of the United States of America for Governmental purposes without the payment of any royalties thereon or therefore.

CROSS REFERENCE TO OTHER PATENT APPLICATIONS

This patent application is co-pending with one related patent applications entitled FUNCTIONAL ELEMENT TEST TOOL AND METHOD, patent application Ser. No. 09/898,714, filed Jul. 3, 2001.

BACKGROUND OF THE INVENTION (1) Field of the Invention

The present invention relates generally to development and testing of a software module for operation within large software systems and, more specifically, to a system operation test facilitating program operable for providing a stand alone system operation test tool that simulates a plurality of computer programs as seen by the aforesaid software module being developed, that form the software environment in which the software module being developed will eventually operate. That is to say, the test facilitating program is a simulator of the large software system.

(2) Description of the Prior Art

Large-scale hardware and software systems and applications may typically include many different interrelated functional elements or software modules that may each comprise one or more computer programs. The various functional elements or modules of the system may need to be developed concurrently to form an overall system to save the cost and problems that occur if the functional elements are developed sequentially. Due to the complexity of the system, there is a risk that when a functional element and the overall system are eventually developed that the functional element will not integrate as expected into the overall system. It would be desirable to somehow reduce the risk of system component integration problems without the need to stop concurrent development of the various functional elements.

The present invention may be used in conjunction with the software disclosed in the hereinabove referenced related co-pending U.S. patent application Ser. No. 09/898,714, and everything in that co-pending application related to the sensor performance prediction functional segment (SPPFS) of the AN/SQQ-89(V)15 anti-submarine warfare computer program, or related to the common interprocessor communication (IPC) protocol, or related to the common object request broker architecture (COBRA) bridge is hereby incorporated by reference.

As used herein, a functional element is a software module which performs a unique software task and which may have multiple interfaces with other functional elements and/or with an application comprised of numerous functional elements and/or with an overall system comprised of a plurality of applications. In a preferred embodiment of the present invention, the functional element performs one or more tasks which may utilize an inter-task interface or module-to-module communication protocol or mechanism. Each functional element may have multiple interfaces. The interface sets forth constraints on formats, timing, and/or other factors required by an interaction of functional elements that perform different tasks within a computer system.

The following patents describe various types of simulators that have been developed in the past.

U.S. Pat. No. 4,192,082, issued Mar. 11, 1980, to Deaton et al., discloses an electronic warfare simulator that is used to teach students how to operate passive electronic warfare equipment. A computer produces simulated radar signals that duplicate the characteristics of real world radar emitters. These characteristic signals are input to a plurality of pulse generators and mixers which act upon the signals and stimulate a pulse analyzer in order for the pulse analyzer to realistically activate electronic warfare equipment.

U.S. Pat. No. 5,474,454, issued Dec. 12, 1995, to Knapp et al., discloses a system for simulating own ship sensor outputs for submarine trainers. The system is comprised of five personal computer systems operating together. These computers are interconnected such that the individual computers can exchange data and function as one integrated unit. The system provides sensor output to an external trainer through multiple I/O cards. The system also accepts trainer inputs on these lines. Software modules on the personal computer systems allow the operator to configure and monitor the sensor systems as well as providing processing of inputs received at multiple sources to generate a coherent output signal.

U.S. Pat. No. 5,551,875, issued Sep. 3, 1996, to Shaffer et al., discloses a land based launch tube control panel testing and training system for a submarine's launcher that interconnects with a launch tube control panel from a submarine to simulate the operation of a submarine weapons launching system to allow for launch tube control panel operational testing and training of operator and maintenance personnel training. In a simulation mode, a submarine weapons launch tube control panel tester and trainer is responsive to weapons launch system control data signals received from the launch tube control panel, for transmitting to the launch tube control panel weapons launching system operational data signals having a predetermined data type and data value which are a function of the received weapons launching system control data signals. In the training and maintenance mode, the submarine weapons launch tube control panel tester and trainer can provide predetermined fault simulations to allow the training of maintenance personnel, as well as test signals which can be utilized to exercise and verify the operability of a tube control panel.

U.S. Pat. No. 5,591,031, issued Jan. 7, 1997, to Monk et al., discloses a missile simulator training apparatus for pilot training of an aircraft of the type having at least one missile station and including a pre-launch module for substantially simulating the pre-launch functions of a missile in response to data received from the aircraft. The apparatus also includes an inert factor formed missile body, thereby providing the apparatus with static and aerodynamic loads equivalent to that of an actual missile. The apparatus further includes a data link and data capture module for recording all data transactions between the apparatus and the aircraft for post-flight analysis of aircraft and pilot performance.

U.S. Pat. No. 5,969,835, issued Oct. 19, 1999, to Kamieniecki et al., discloses an automated signal generator apparatus that allows testing of remotely-controlled electronic devices to verify functionality and reliability, or for product set-up, initialization or configuration. The apparatus simulates a person pressing the keys on a remote control keypad, and can simulate key press sequences, key press duration, and time between key presses. Other human interfaces may also be simulated. The apparatus can be continuously driven by an external computer in a slaved mode, or can store test instructions in an internal memory to operate in a standalone mode. Test instructions, which may be written in a macro script language, are processed by a microprocessor to provide a control signal to, e.g., an infrared (IR) transmitter. The IR transmitter can control one or more electronic devices which are under test. The transmitter may use a wide-angle IR beam, or a plurality of separate transmitters for testing of a plurality of electronic devices at the same time. In a human learning mode, control signals from a human interface are processed to provide time compression or repetition of a fixed control sequence.

The above cited prior art does not provide a means for verifying that a software functional element will suitably integrate within an overall software system comprising a plurality of computer programs that are still under development. Consequently, there remains a long felt but unsolved need for improved software functional element development tools to insure reliable integration thereof into a complex software system that is developed concurrently with the software functional element. Those skilled in the art will appreciate that the present invention addresses the above and other problems.

SUMMARY OF THE INVENTION

Accordingly, it is an object of the present invention to provide an improved system and method for developing and/or testing a functional element of a computer software system to improve reliability of integration of the functional element into the overall computer software system.

Another object of the present invention is to provide more reliable integration of a functional element being developed into a software system that is being developed concurrently.

Still another object is to provide a system and method as aforesaid which provides a controlled test environment to test operation of a functional element with respect to integration with other functional elements of an overall system that are being developed concurrently.

A further object is to provide a system and method as aforesaid which simulates a plurality of programs as seen by the functional element being developed.

A still further object is to provide a system and method as aforesaid that can facilitate off-line quantitative analysis of the test results and collected data.

Yet another object is to provide a system and method which enables software development in a manner to reduce the overall number of defects that occur during the development phase.

These and other objects, features, and advantages of the present invention will become apparent from the drawings, the descriptions given herein, and the appended claims. However, it will be understood that above listed objects and advantages of the invention are intended only as an aid in understanding aspects of the invention, are not intended to limit the invention in any way, and do not form a comprehensive list of objects, features, and advantages.

In accordance with the present invention, a test facilitating computer program product is provided for simulating a plurality of interrelated computer programs and associated software interfaces that comprise an overall computer system as seen by a functional software element. The test facilitating computer program product is operable to simulate computer messages between the plurality of interrelated computer programs and the functional software element through one or more internal interfaces of the functional software element.

The invention may comprise one or more elements such as, for instance, one or more external software interface simulating modules which simulate preselected messages that issue from the associated software interfaces of the plurality of interrelated computer programs to the internal interfaces of the functional software element. The software external interface simulating modules are operable for simulating interface message receipt and transmission from the plurality of interrelated computer programs from and to the functional software element through the internal interfaces of the functional software element.

The test facilitating computer program product may comprise a message collector and storage operatively associated with the software external interface simulating modules to facilitate off line analysis of performance of the functional software element and/or an input to enable a user of the test facilitating computer program product to preselect messages which a respective of the plurality of interrelated computer programs will transmit to the functional software element to exercise a capability of the functional software element to thereby validate performance and accuracy of the functional software element. An example of such a functional software element is sensor performance prediction functional segment (SPPFS) which performs forecasting and analysis of different acoustic signal propagation models used in AEGIS weapon system combat control.

In one embodiment, the test facilitating computer program product is operable for simulating an AN/SQQ-89(V) 15 antisubmarine warfare (ASW) warfare computer system program as seen by the functional software element. More specifically, the software external interface simulating modules are operable to simulate interface functions as executed by the functional software element of an acoustic sensor functional segment (ASFS), a common systems services functional segment (CSSFS), a light airborne multipurpose system (LAMPS) sonobuoy functional segment (LSFS), a undersea warfare control functional segment (UCFS), and a computer aided dead reckoning tracer support segment (CADRT).

In operation, a method is provided for development of a functional software element for operation with a plurality of computer programs which may communicate utilizing a common interprocessor communication (IPC) protocol. The method may comprise one or more steps such as, for instance, developing a test facilitating computer program product which simulates operation of the plurality of computer programs as seen by the functional software element and/or using the test facilitating computer program product to test the functional software element undergoing development.

The method may comprise providing one or more simulated external software interfaces which simulate external interface functions of the plurality of computer programs with respect to the functional software element and/or storing messages sent between the plurality of simulated external software interfaces of the test facilitating computer program product and the internal interfaces of the functional software element.

Other steps may comprise displaying messages sent between the plurality of simulated external software interfaces of the test facilitating computer program product and the internal interfaces of the functional software element and/or displaying a software control panel for operation of the test facilitating computer program and/or utilizing the software control panel to select a plurality of simulated messages for transmission to the functional software element.

The method may comprise utilizing the software control panel to start a scenario which automatically sends a plurality of preselected simulated messages to the functional software element and stimulates production of a plurality of messages by the functional software element. The method may comprise sending simulated data, such as acoustic array data that may be stored in one or more files, in response to a request for the data by the functional software element. The software control panel may also be utilized to monitor messages sent to, received from, or requested by the functional software element during the scenario.

In another embodiment, a method is provided for developing a software functional element that integrates with a plurality of other software functional elements to comprise an overall software system whereby the plurality of other software functional elements are simultaneously being developed. The method may comprise steps such as developing a test facilitating computer program product which simulates operation of the plurality of computer programs as seen by the functional software element and developing one or more simulated external software interfaces for interfacing between the software functional element and the plurality of computer programs.

Other steps may comprise storing files containing messages to be sent to the software functional element from the plurality of computer programs utilizing the simulated external software interfaces and/or monitoring messages sent from and received by the simulated external software interfaces and/or displaying errors due to incorrect transmission or receipt of messages between the software functional element and the simulated external software interfaces and/or displaying a computer control panel on a computer screen for controlling the test facilitating computer program product.

BRIEF DESCRIPTION OF THE DRAWINGS

A more complete understanding of the invention and many of the attendant advantages thereto will be readily appreciated as the same becomes better understood by reference to the following detailed description when considered in conjunction with the accompanying drawings wherein corresponding reference characters indicate corresponding parts throughout several views of the drawings and wherein.

ONE OF THE PREFERRED EMBODIMENTS

Figure 1:
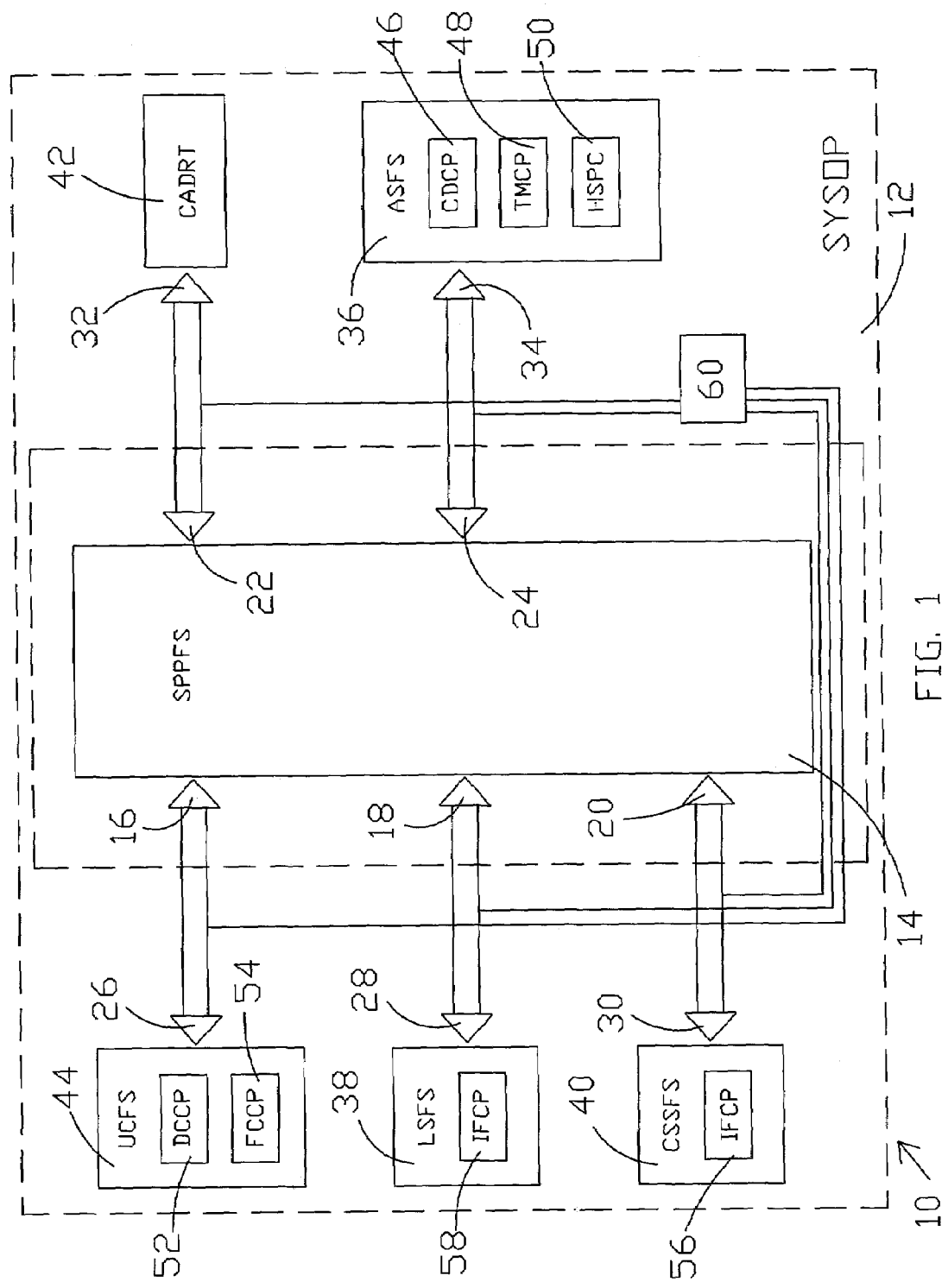
FIG. 1 is a schematic which shows a system operation test facilitating program for use in testing a functional element in accord with the present invention.

Referring now to the drawings and, more specifically to FIG. 1, there is shown a schematic of test facilitating system 10 that comprises a test facilitating program 12 (i.e., the components within the bounds of the dashed line), which may be referred to herein as SYSOP 12, that acts to simulate the system environment in which functional element 14 (the solid line blocks and associated internal interfaces represented by inwardly pointing arrowheads touching the block) will be the object of integration testing. SYSOP 12 provides a stand-alone system operation function (SYSOP) to effectively simulate the overall software system as seen by the functional element 14. The overall software system simulated by SYSOP 12, in a presently preferred embodiment, may be the AN/SQQ-89(V)15 system computer program for use in submarines. The AN/SQQ-89(V)15 is a sonar-based anti-submarine warfare (ASW) computer program. The AN/SQQ-89(V)15 computer system program may, at the present time, have eighty-nine functional elements, wherein each functional element comprises one or more computer programs, some of which are discussed herein. However, the present invention could be utilized generally for developing other large computer systems which include a plurality of functional elements and associated computer programs to be simulated by test facilitating program 12 and other functional elements 14. Functional element 14 is a component element of ASW computer program AN/SQQ-89(V)15 which is the object of the testing of reliability of its integration into the AN/SQQ-89(V)15. For purposes of illustration of the invention a sensor performance prediction segment (SPPFS), which is one of the eighty-nine functional elements of the AN/SQQ-89(V)15 is shown in FIG. 1 and is the nominal functional element 14 discussed in the description of this invention. Briefly, SPPFS performs forecasting and analysis of different underwater signal propagation models.

In accord with the methods of the present invention for developing software, the AN/SQQ-89 (V) 15 is to be developed concurrently at the same time SPPFS functional element 14 is being developed and therefore is not presently available for use in developing SPPFS functional element 14. SYSOP 12 may be utilized to simulate the AN/SQQ-89 (V) 15 computer system program and therefore provide an environment to verify operation of functional element 14 as required for development purposes.

SPPFS Functional element 14 may have multiple interfaces with software programs of an integrated system of AEGIS weapon system AWS equipment digital processors. Thus, the SPPFS and the AN/SQQ-89(V)15 are programs/actual processors that are being developed. SYSOP 12 comprises the present invention and operates with SPPFS functional element 14 as a simulator of the AN/SQQ-89(V) 15 computer system program.

Thus, SYSOP 12 provides the equivalent as seen by SPPFS functional element 14 of various components of the AN/SQQ-89(V)15 sonar-based antisubmarine warfare computer system program and provides an independent test environment for the entire SPPFS system. SYSOP 12 functionally simulates all SPPFS functional element 14 external interfaces, thereby providing the ability to record, accept, and respond to all SPPFS external messages as well as generate input messages to SPPFS. The operation may be monitored, and an operator may generate input messages, as indicated in control panel 100 for controlling software programs shown in FIG. 2. Control panel 100 is of a conventional type providing a computer screen-based display and enabling interactive operator control of operation of software computer programs by means the operator pointing and clicking a computer mouse relative to a computer monitor display showing dialog boxes and buttons. Input and/or response messages can be either manually input from SYSOP 12 displays or automatically produced from a data file in accord with a scenario of operation.

For example, via SYSOP 12, the operator has the ability to initiate a simulation of a drop of an expendable bathythermograph (XBT) buoy and control the contents of the XBT data. This is sent to functional element 14, in this case SPPFS, and the performance of SPPFS is assessed by collecting relevant messages and data. An example of the automatic response of SYSOP 12 occurs when SPPFS requests active array background (AAB) data from the submarine hull segment. SYSOP 12 can be set up to automatically respond to this request with pre-determined data. The corresponding SYSOP 12 interface is emulated to perform as the actual interface would.

The SPPFS Functional element 14 may comprise one or more internal software interfaces 16, 18, 20, 22, and 24. These internal software interfaces may be utilized to communicate with one or more external software interfaces 26, 28, 30, 32, and 34 of SYSOP 12. Thus, interfaces 26–34 of SYSOP 12 emulate the actual interfaces of the AN/SQQ-89 (V)15 computer system program.

In a presently preferred embodiment, communications may be made through a single type of interface which may be referred to as a common object request broker architecture (CORBA) bridge. This type of interface is conventional and well known. Software interfaces 16–34 are preferably interfaces of this type that permit different software modules to communicate with each other. Software interfaces 16–34 may utilize a common interprocessor communication (IPC) protocol relating to timing, status, data software registers, control signals, memory locations, data transfer rates, and so forth. A number of such IPC protocols are within the knowledge of those having skill in the art, from which a selection may be made.

In the present embodiment, SYSOP 12 simulates the AN/SQQ-89(V)15 to/from acoustic sensor functional segment (ASFS) 36, LAMPS sonobuoy functional segment (LSFS) 38, common system services functional segment (CSSFS) 40, computer aided dead reckoning table (CADRT) 42, and undersea warfare control functional segment (UCFS) 44 as indicated in FIG. 1.

SYSOP 12 facilitates system level testing of SPPFS functional element 14 independent of the actual AN/SQQ-89(V)15 computer program system. In addition, SYSOP 12 provides a controlled test environment that will facilitate off-line data analysis of the test results and collected data. Finally, SYSOP 12 provides a good pre-integration risk mitigation test environment. SYSOP 12 provides simulated outputs/inputs needing to be present at the interfaces of the AN/SQQ-89(V)15 warfare system computer program external to the SPPFS for conducting integration tests of the SPPFS functional element thereof, and the outputs/inputs needing to be present at the interfaces internal to the SPPFS in order to validate the SPPFS system operation and data processing.

Acoustic sensor functional segment or ASFS 36 may comprise several computer programs such as control and display computer program (CDCP) 46, track manager computer program (TMCP) 48, and hull signal processing computer program (HSPC) 50. For operation with ASFS 36, SYSOP 12 may be utilized to send and/or receive and/or respond to various messages.

Figure 2:
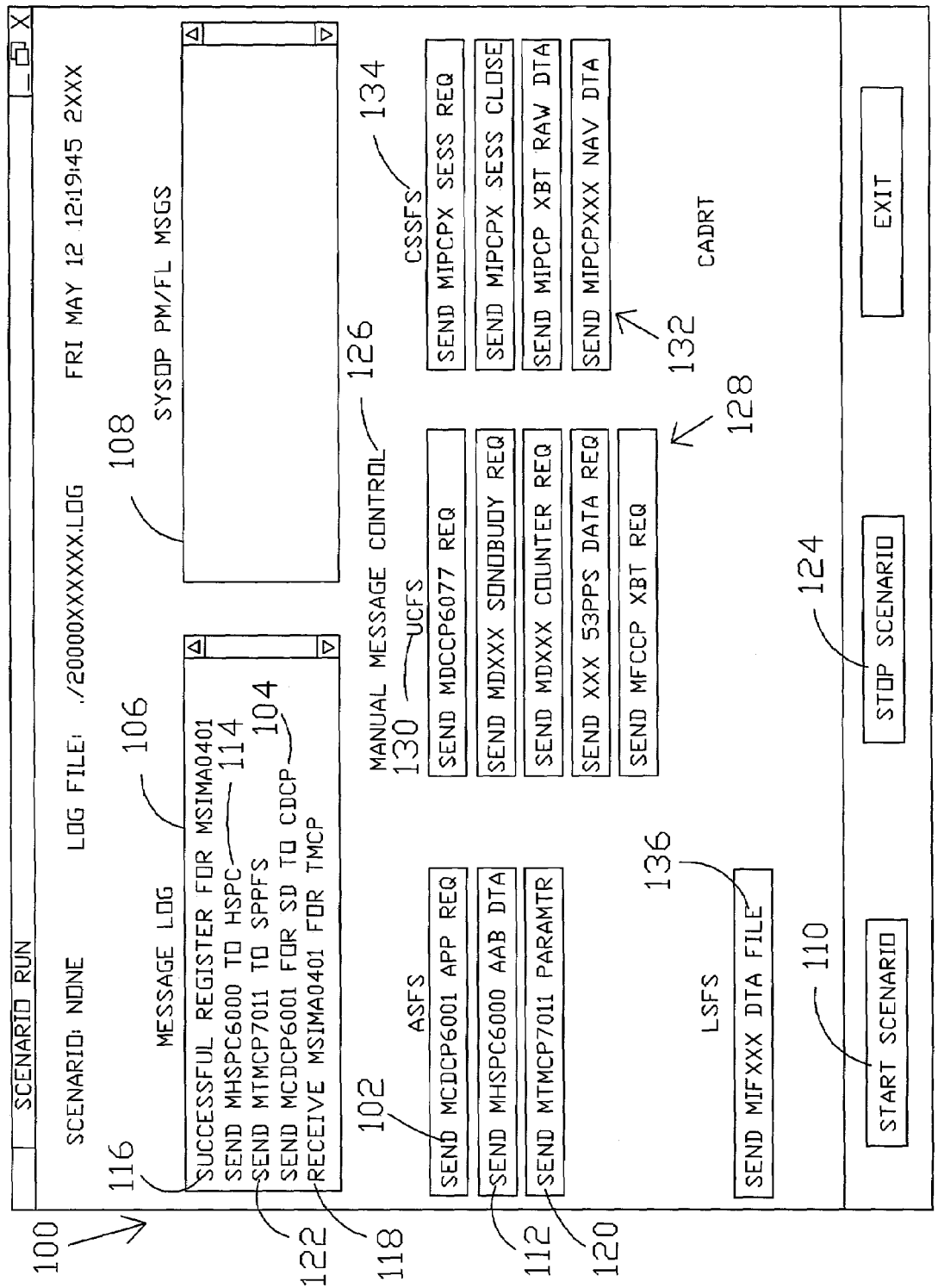
FIG. 2 is a representative embodiment of a computer display of a control panel for operating the system operation test facilitating program of FIG. 1 in accord with the present invention.

For instance, referring to FIG. 2, by selecting button 102, a control message presently labeled as MCDCP6001, is to be used with CDCP 46, and may be sent by an operator utilizing control panel 100. A corresponding message 104 may be shown in message log window 106 in response thereto. The message may also be sent automatically at specified time periods and/or in response to certain events that may be set up by the operator and/or initiated by pressing start scenario button 110. The messages may come from various sources during a scenario execution such as a user provided data file, a default SYSOP 12 data file, or may be derived from scenario setup parameters for ASFS 36. If in the case a data file is selected, then SYSOP 12 reads the data file prior to message transmission to receive the contents of the message. SYSOP 12 stores the status and timing information in a scenario log file. If the message transmission fails, then the operator may be alerted such as through an indication in message log window 106 and/or window 108. The various times of sending/receipt of messages may be recorded as desired for review, analysis, playback, and the like.

All messages may be monitored, collected, and stored in a memory such as, for example memory 60, along with timing, status, and/or other related information for archiving, playback, analysis, and/or other functions. While memory 60 is shown as a separate memory, storage for memory 60 may be incorporated in the memory utilized for storing various functional elements such as CADRT 42, ASFS 36, LSFS 38, CSSFS 40, and UCFS 44.

Likewise, SYSOP 12 may perform similar functions concerning other messages such as active array background (AAB) data message that may be referred to as MHSPC6000 AAB DTA, as indicated by button 112 in panel 100 of FIG. 2. This message may be sent to hull signal processing computer program (HSPC) 50. Thus, this information may comprise data, such as background signal data, that is received from a simulated active array of sensors and may be sent automatically to SPPFS functional element 14 in response to a request from SPPFS for this information. The message would be logged as indicated at 114 in message log window 106.

As another example, bottom depth/sound speeds data message, which may be referred to as MSIMA0401 may be sent between SYSOP 12 and track manager computer program (TMCP) 48 as indicated at 116 and 118. As yet another example, an in-use mode waveform definition message, which may be called, MTMCP7011 as indicated at 120 and 122 may be sent to TMCP 48 as desired and may be recorded, read from different sources, stored with timing and status, and/or provided with means to determine the successful operation in response thereto as discussed above.

As indicated above, start scenario button 110 may be utilized to automatically send/receive/respond to various messages between SYSOP 12 and SPPFS functional element 14. Stop scenario button 124 may be utilized to stop the test at any time. If manual commands are desired, then manual control portion as indicated at 126 may be utilized with buttons therebelow. Groups of buttons may correspond to various components of SYSOP 12 that would operate with SPPFS function element 14. For instance, button group 128 may comprise buttons that send messages to UCFS 44 as indicated at 130. Undersea warfare control functional segment or UCFS 44 may be comprised of computer programs such as display and control computer program (DCCP) 52 and fire control computer program (FCCP) 54. This section may include various commands such as an environment data request, an expendable bathythermograph data request, sonobuoy data request, a counter data request, and the like.

Likewise, button group 132 may be utilized to send messages to other elements of SYSOP 12 such as to common system services function (CSSFS) 40 as indicated at 134 that may comprise interface processing computer program (IFCP) 56. Messages may include navigation data, wind data, depth data, expendable bathythermograph raw data, environmental data, predicted acoustic coverage, probe type, predicted sonobuoy coverage, display status, and the like. Again, the messages can be generated from numerous sources such as data files, stored with timing and status signals, and/or the system can be notified of message failures.

As another example, one or more buttons 136 may be utilized in conjunction with sending messages to LAMPS sonobuoy functional segment or LSFS 38 which includes interface processing computer program or IFCP 58. Messages may include bathythermograph BT data file table data.

Thus, in operation of the present invention, a first test facilitating program such as SYSOP 12 is provided for simulating an overall computer system that may be utilized in the creation of a second program such as functional element 14 which may for illustrative purposes comprise, a sensor performance prediction functional segment or SPPFS. SYSOP 12 will comprise one or more software interfaces, such as software interfaces 26–34, that are external interfaces with respect to functional element 14. The actual overall computer system, such as an AN/SQQ-89(V) 15 computer system is not required. SPPFS Functional element 14 will preferably comprise internal software interfaces such as one or more software interfaces 16–24. SYSOP 12 will be operable for simulating the various computer programs or groups of computer programs in the overall computer system, as well as their interfaces, as would be seen by SPPFS functional element 14. SYSOP 12 will therefore be operable to send/receive/respond to various types of messages, such as control signals, data files, definitions, and other types of information as would be transferred therebetween. The messages or signals can be recorded, archived, and played back. The system may include means for converting existing archived tapes of data and/or information into a format for use with the AN/SQQ-89(V)15 system program whereby functional element 14 may be tested with actual data and/or information of the types required. For instance, functional element 14 may request data such as data from an active array. SYSOP 12 will then automatically respond, just as would the AN/SQQ-89(V)15 system program by sending the prepared or simulated data to functional element 14.

Quality software can be developed in less time and with fewer overall defects due to the use of SYSOP 12 during the initial development phase as well as overall life cycle maintenance.

It will be appreciated by those skilled in the art that the invention can be implemented using a suitable programmed general purpose computer or special purpose hardware, with program routines or logical circuit sets performing as processors. Such routines or logical circuit sets may also be referred to as processors or the like.

Therefore, it will be understood that many additional changes in the details, materials, steps and arrangement of parts, which have been herein described and illustrated in order to explain the nature of the invention, may be made by those skilled in the art within the principle and scope of the invention as expressed in the appended claims.

What is claimed is:

1. A method for integration testing of an overall computer system under development comprising:

providing a test facilitating computer having a processor, a log file, a stored command file with a sequence of commands, data storage, a plurality of functional element interfaces and a plurality of user interfaces, said test facilitating computer being capable of monitoring the timing of messages at the user interfaces;

providing a plurality of functional elements, each simulating a functional software element of the overall computer system, each functional elements being joined to one of said plurality of functional element interfaces at said test facilitating computer;

initiating commands from said stored command file of said test facilitating computer, wherein each said command is related to at least one of said plurality of functional elements and said test facilitating computer, each said command having an action associated therewith, each said command optionally having stored data associated therewith;

providing said initiated commands to said related functional element with any associated stored data;

receiving a response to said provided command at said test facilitating computer;

coordinating received responses from various functional elements;

transmitting said coordinated received responses to other functional elements;

logging said initiated commands, said received responses and said coordinated received responses in said log file at said test facilitating computer; and evaluating said log file to determine if said functional elements are performing properly.

2. The method of claim 1 further comprising monitoring commands and responses sent through said plurality of functional element interfaces and user interfaces.

3. The method of claim 2 further comprising displaying errors on a user interface of said test facilitating computer caused by incorrect transmission of commands and responses between said functional elements and said functional element interfaces.

4. The method of claim 2 further comprising logging errors in said log file of said test facilitating computer caused by incorrect transmission of commands and responses between said functional elements and said functional element interfaces.

5. The method of claim 1 wherein said step of evaluating said log file includes determining whether said functional elements are responding to said commands from said test facilitating computer in a predicted manner.

6. The method of claim 1 wherein said step of initiating commands initiates commands at predetermined times.

7. The method of claim 1 wherein said step of initiating commands initiates commands based on an input to the user interface of said test facilitating computer.

8. The method of claim 1 wherein at least one of said plurality of functional elements is a prototype of a system being developed.

9. The method of claim 8 wherein at least one of said plurality of functional elements is simulated to provide expected responses and data.

* * * * *